(12) United States Patent
Bader

(10) Patent No.: US 10,322,952 B1
(45) Date of Patent: *Jun. 18, 2019

(54) METHODS TO DE-SALT SOURCE WATER

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 70 days.

This patent is subject to a terminal disclaimer.

(21) Appl. No.: 15/731,999

(22) Filed: Sep. 7, 2017

Related U.S. Application Data

(63) Continuation-in-part of application No. 15/731,626, filed on Jul. 10, 2017, and a continuation-in-part of application No. 15/731,637, filed on Jul. 10, 2017, which is a continuation-in-part of application No. 13/999,309, filed on Feb. 8, 2014, now Pat. No. 9,701,558, said application No. 15/731,626 is a continuation-in-part of application No. 13/999,309, filed on Feb. 8, 2014, now Pat. No. 9,701,558.

(51) Int. Cl.
| | |
|---|---|
| C02F 1/04 | (2006.01) |
| C02F 1/44 | (2006.01) |
| B01D 1/30 | (2006.01) |
| B01D 3/06 | (2006.01) |
| B01D 3/00 | (2006.01) |
| C02F 1/06 | (2006.01) |
| B01D 61/36 | (2006.01) |
| C02F 103/08 | (2006.01) |

(52) U.S. Cl.
CPC ............. *C02F 1/447* (2013.01); *B01D 1/305* (2013.01); *B01D 3/007* (2013.01); *B01D 3/06* (2013.01); *B01D 61/364* (2013.01); *C02F 1/06* (2013.01); *C02F 1/042* (2013.01); *C02F 2103/08* (2013.01); *C02F 2303/10* (2013.01)

(58) Field of Classification Search
USPC ............. 203/10, 1, 3; 159/DIG. 39; 210/640
See application file for complete search history.

(56) References Cited

U.S. PATENT DOCUMENTS

| 5,925,223 A * | 7/1999 | Simpson ................ B01D 3/065 203/11 |
| 6,365,051 B1 | 4/2002 | Bader |
| 6,783,682 B1 * | 8/2004 | Awerbuch ................ B01D 1/26 210/652 |
| 7,093,663 B1 | 8/2006 | Bader |
| 7,501,065 B1 * | 3/2009 | Bader .................. B01D 61/025 210/652 |

(Continued)

*Primary Examiner* — Nina Bhat

(57) ABSTRACT

A system and method for effectively desalinating a source of water is provided. The source of water is desalinated by a desalination train comprising at least a heat exchanger, a plurality of flashing stages comprising hydrophobic membranes under reduced pressure, and at least a compression device. The source of water is passed through the heat exchanger prior to passing through the flashing stages to bring it to a vaporizing temperature by maintaining the flashing stages at reduced pressure so that at least a portion of water flashes into vapor. The vapor from the flashing stages is withdrawn, and at least a portion of the withdrawn vapor is compressed by the compression device. The compressed vapor is then condensed in the heat exchanger to produce a distillate stream, and heat the source of water before it enters the flashing stages.

20 Claims, 13 Drawing Sheets

(56) References Cited

U.S. PATENT DOCUMENTS

| | | | |
|---|---|---|---|
| 7,789,159 B1 | 9/2010 | Bader | |
| 7,922,873 B2 * | 4/2011 | St. Germain | C02F 1/16 202/155 |
| 7,934,551 B1 | 5/2011 | Bader | |
| 7,963,338 B1 | 6/2011 | Bader | |
| 8,197,696 B1 * | 6/2012 | Bader | C02F 1/66 210/639 |
| 8,915,301 B1 * | 12/2014 | Bader | C02F 9/00 166/371 |
| 8,961,916 B1 | 2/2015 | Bader | |
| 9,102,545 B2 * | 8/2015 | Riley | B01D 1/225 |
| 9,701,558 B1 | 7/2017 | Bader | |
| 9,751,777 B1 * | 9/2017 | Bader | C02F 1/40 |
| 9,969,638 B2 * | 5/2018 | Govindan | C02F 9/00 |
| 10,005,681 B2 * | 6/2018 | Tarquin | C02F 1/441 |
| 10,167,218 B2 * | 1/2019 | St. John | C02F 9/00 |

* cited by examiner

METHODS TO DE-SALT SOURCE WATER

RELATED APPLICATIONS

This application is a continuation-in-part of my patent application Ser. No. 15/731,626 filed on Jul. 10, 2017 and my patent application Ser. No. 15/731,637 filed on Jul. 10, 2017; both of which are continuation-in-parts of my patent application Ser. No. 13/999,309 filed on Feb. 8, 2014, now U.S. Pat. No. 9,701,558.

BACKGROUND OF THE INVENTION

In de-salting (desalination) systems (e.g., temperature-induced, pressure-induced, or a combination), source water to be de-salted is generally unsaturated of some scaling compounds (e.g., gypsum in seawater; Table 1: S1). The inventor illustrates this situation in FIG. 1. During de-salting, source water is brought closer to saturation of such scaling compounds, but simultaneously, the concentrations of the background salts are also increasing. Since the solubilities of the scaling compounds vary with the concentrations of the background salts, the solubilities of the scaling compounds are constantly changing as de-salting continues. As such, the entire history of de-salting has been evolving around avoiding scale formation by operating de-salting systems within the thresholds (solubility limits) of the scaling compounds that change with changing the concentrations of the background salts. However, neither scaling thresholds in an actual de-salting system can be inferred from simple solubility measurements nor can be avoided by conventional source water pre-treatment (e.g., by adding an acid to control alkaline scale and a scale inhibitor to delay sulfate scale). As a result, de-salting systems cannot be brought to their intrinsic productivities, and their brine disposal presents a problem in terms of volume and scale-infested species (e.g., Table 1: S2 to S4).

Such, is illustrated, for example, in two recently installed conventional recycle-brine multi-stage flash (RB-MSF) desalination systems (plants) that produce about 240 million U.S. gallons per day (MGD) of distillate from seawater. Each plant comprises 8 identical and independent RB-MSF desalination trains. An RB-MSF desalination train is illustrated in FIG. 2 (application Ser. No. 15/731,626 and application Ser. No. 15/731,637; FIG. 6, Configuration B, an RB-MSF desalination train). The needed amount of total seawater feed stream for both plants is 2,247 MGD, which is enormous. The total seawater feed stream comprises two portions: (1) about 1538.2 MGD as cooling seawater for the heat rejection sections of the RB-MSF desalination trains that must be partially pre-treated (e.g., screening and chlorination) and rejected back to a sea; and (2) about 654.8 MGD as the actual seawater feed stream to produce distillate, which is conventionally pre-treated (e.g., by de-carbonating and adding scale inhibitors, oxygen scavengers and foam suppressors). Here, the latent heat from the evaporating vapor in the heat rejection sections of the RB-MSF desalination trains is exhausted to waste in reject cooling seawater. Yet, the ratio of distillate to total seawater feed stream is about 10%, which is an unmatched inefficiency in terms of distillate recovery ratio, the required enormous pumping power for the total seawater feed stream and reject cooling seawater, and relatively high conventional seawater pre-treatment costs.

The amount of recycle brine in both plants that must be constantly circulated through the heat recovery sections of the RB-MSF desalination trains is 2,185.8 MGD, which is also enormous and nearly equivalent to the amount of the total seawater feed stream. Similarly, it requires an enormous pumping power as well as treatment with scale inhibitors and oxygen scavengers.

The amount of heavily scale-infested reject brine (Table 1: S3) from both plants is 905.4 MGD, which is also enormous and must be blown down to a sea. Such reject brine: (1) increases salinity, including all of the concentrated scale pairing ions (magnesium, calcium and sulfate), around seawater intake lines, which, in turn, deteriorates the natural ions composition of seawater (changes the thresholds of scaling compounds) and imposes different sets of operating conditions on the plants; and (2) environmentally impacts marine habitats since reject brine is depleted of oxygen as well as enriched with residues of deoxygenating agents, concentrated toxic species (e.g., derivatives of boron and chlorine), and gypsum.

The scale formation problem has taken on new proportions arising from the urgent need to de-salt source water of saturated scaling compounds, high oil content, high salinity, or a combination (e.g., produced water and the like). Wet oil, which is a macro-emulsion, is the source of produced water. Since macro-emulsions are not thermodynamically stable, they will naturally segregate into the original phases (oil and water), if given enough (may be infinite) time to rest. In wet oil processing; however, the needed time to segregate oil from water is transcended by a gravity separator (e.g., a two- or three-phase separator, a gravity tank, a skim tank, etc.), an accelerated separator (a hydrocyclone or a centrifuge), or a combination. Such wet oil segregation processes are basically breaking down a given "primary" emulsion, whether the dispersed phase in the "primary" emulsion is water (a "water-in-oil" emulsion) or the dispersed phase is oil (an "oil-in-water" emulsion), into two "secondary" emulsions; one is richer and the other is poorer in the dispersed phase of the "primary" emulsion. The inventor illustrates such wet oil segregation approaches in FIG. 3. As such, neither the water phase is sufficiently de-oiled nor is the oil phase sufficiently de-watered; thereby each of the phases (oil and water) requires further multiple and intricate processing steps. Yet, charged organic species (e.g., oxygen-, nitrogen-, and sulfur-containing species) are common in wet oil, which not only hinder the segregation of the oil phase from the water phase but also heavily contribute to scale formation in the water phase. Yet, as illustrated in FIG. 4, for example, there may be no thresholds (e.g., the solubility of gypsum is at the saturation limit) of the scaling compounds in produced water to "zero in" for at least partially operating a de-salting method. Thus, a de-salting method may be forced to operate at, or above, the saturation limits of scaling compounds.

Such, is also illustrated, for example, in FIG. 5 wherein produced water may be de-salted by a mechanical vapor recompression (MVR) system without proper obviation of the oil content and saturated scaling compounds. Here, the de-oiling steps are deficient since they generate roughly de-oiled produced water that carries over at least some of the oil content to the feed heat exchanger, steam stripper and MVR (evaporator). The carried over oil content acts as a foulant for heat transfer surfaces and causes severe foaming problems.

Produced water may be also saturated with calcium sulfate (gypsum) before processing (e.g., FIG. 4; Table 1: S6 and S7). As evaporation progresses in the feed heat exchanger and the steam stripper prior to the evaporator, calcium sulfate along with other notorious scaling compounds are increasing in concentrations, which would: (1) cause scale fouling/plugging problems; (2) reduce heat transfer efficiency; and (3) elevate the boiling point thereby reducing the temperature driving force for heat transfer. The latter is a critical factor in designing a conventional MVR with low temperature driving force above normal boiling of a saline stream.

Aside from the feed heat exchanger and steam stripper that are directly subjected to calcium sulfate scaling, such scaling is presumably controlled within only the evaporator by a seeding mechanism. Since the main scaling compound (gypsum) in produced water is at it is saturation limit, a sulfate-based compound (e.g., sodium sulfate or calcium sulfate) is used as a seeding agent in the evaporator to presumably minimize tubes plugging. However, hemihydrate is the first form of calcium sulfate hydrates to precipitate in the evaporator according to the rule of "stepwise sequence" of phase transformations (from less stable to more stable forms) and it is precipitation evolves rapidly and for a relatively finite time (e.g., extends to several hours) compared to the detention time elapsing during the circulation of brine through the evaporator. Thus, the metastable hemihydrate would continuously deposit on the heat transfer tubes even though calcium sulfate is readily supersaturated in the slurry but the anhydrite stable form may not be attained quickly enough to minimize tubes plugging The seeding agent must be selected of the same form that deposits during evaporation but even if a selected form of calcium sulfate was used as a seeding agent, different forms of calcium sulfate (hemihydrate and anhydrite) would co-exist and vary with the conditions in the evaporator. If sodium sulfate was used as a seeding agent, on the other hand, the forms of sodium sulfate would have a temperature-solubility phase diagram [see e.g., U.S. Pat. Nos. 7,501,065 and 8,197,696] that totally differs from the temperature-solubility phase diagram of calcium sulfate forms. In addition, the seeding agent must be dispersed in the evaporator in the form of very fine particles, and the amount of the seeding agent must substantially exceed the concentration of calcium sulfate in produced water. Thus, the seeding mechanism is very difficult to control since the: (1) seeding agent may be a mismatch (in terms of type, form, particle size, and combinations of these factors) even though it is in the form of sulfate; and (2) amount of the seeding agent is considerable. As a result, the seeding mechanism: (1) requires a high flow rate to evaporate produced water in the heat transfer tubes, which may diminish the evaporation efficiency; and (2) is not adoptable in multi-stage flash evaporators wherein the boiling point of circulated brine is successively reduced by reducing pressure.

As such, the conventional primitive management of scale problems vary from operating a de-salting system within the thresholds (solubility limits) of the scaling compounds that change with changing the concentrations of the background salts (e.g., seawater), to operating a de-salting system from saturation to induced supersaturation of scaling compounds (e.g., some produced water). As a result, scale problems remain the focal issue that historically diminishes the productivity of any de-salting system.

The inventor consistently characterizes such reactive scale avoiding and scale overriding approaches (operating within the thresholds of scaling compounds such as calcium sulfate and using scale inhibitors or operating above the thresholds of scaling compounds such as calcium sulfate and using seeding mechanisms as well as scale inhibitors) as severely deficient to solve scale problems, whether source water is used for feeding a de-salting system, oil-gas fields' water applications, or the like. However, the inventor rather teaches proactive approaches by not only "zeroing in" on selectively and effectively removing scale prone compounds but also on recovering such compounds as useful by-products, thereby allowing any de-salting system, for example, to reach its intrinsic productivity in the absent of scale [e.g., U.S. Pat. Nos. 6,365,051; 6,663,778; 7,093,663; 7,392,848; 7,501,065; 7,789,159; 8,915,301; 9,701,558; application Ser. No. 15/731,626; and application Ser. No. 15/731,637].

Similarly, the inventor consistently characterizes wet oil processing centers as a dual problem since neither the oil phase is sufficiently recovered (de-watered) nor is the water phase (produced water) sufficiently de-oiled, and yet there are still the questions of the: (1) disposal of oily waste streams, oily stripping streams, exhausted adsorption materials, or a combination; (2) environmental impact of discharging produced water; and (3) beneficial use of produced water by de-salting methods remains hindered since neither efficient nor economic de-salting methods can be operated in the absent of efficient de-oiling as well as de-scaling. The inventor, instead, teaches that water de-oiling and oil de-watering are synonymous, and thus they should be simultaneously targeted by an efficient method. The inventor's de-oiling/de-watering concept [e.g., U.S. Pat. Nos. 6,365,051; 7,789,159; 7,934,551; 7,963,338; 8,915,301; 9,701,558; application Ser. No. 15/731,626; and application Ser. No. 15/731,637] is analogous to the natural demulsification phenomenon (a capillary flow) of oil in downhole reservoirs. The inventor illustrates the concept in FIG. 6, whether oil is the continuous phase (a "water-in-oil" emulsion) or oil is the dispersed phase (an "oil-in-water" emulsion). Here, by utilizing the hydrophobic interactions between oil and water (immiscible fluids) along with a properly configured hydrophobic membrane, water (the membrane's non-wetting fluid) would be efficiently repelled while oil (the membrane's wetting fluid) would be permeated through the hydrophobic membrane by applying a low pressure.

As re-emphasized above, de-scaling, de-oiling or a combination is critical since scale, oil content or a combination diminishes the productivity of any de-salting method. De-scaling, in particular, is also very critical since the disposal of reject brine from any de-salting method presents a problem. As such, minimizing the volume of reject brine, if not directly utilizing reject brine, is highly desirable, but is not attainable without effective de-scaling as well as effective de-salting. For effective de-salting, the combination of the multistage flash principle with the vapor compression principle is also highly desirable, but to this day, such a combination has not been attained in a practical manner.

THE OBJECTIVES OF THE INVENTION

This invention recognizes the need for combining the multistage flash principle with the vapor compression principle, and thus the objectives of this invention are to provide effective, simple, flexible, and economical de-salting methods.

SUMMARY OF THE INVENTION

In one aspect, the present invention provides a method for de-salting source water. The inventive method comprising a desalination train wherein the desalination train comprises at least a heat exchanger, a plurality of flashing stages arranged in series and at least a compression device, feeding source water to be desalinated through the heat exchanger and then in succession through the flashing stages to bring source water to a vaporizing temperature by maintaining the flashing stages at progressively lower pressures in the direction of going down the flashing stages, thereby source water at saturation temperature corresponding to the pressure in a flashing stage flows to a next succeeding flashing stage at a lower pressure and arrives in the next flashing stage at a temperature higher than the saturation temperature corresponding to the lower pressure in the next flashing stage so that at least a portion of source water flashes into vapor in each of the flashing stages, withdrawing vapor from each of the flashing stages, compressing at least a portion of the withdrawn vapor by the compression device, condensing the compressed vapor in the heat exchanger thereby producing distillate and heating source water before entering a first flashing stage of the desalination train, and withdrawing unflashed source water from a last flashing stage of the desalination train as reject brine.

The flashing stages comprise hydrophobic membranes under reduced pressure. The flashing stages further comprise vapor-liquid separators under reduced pressure, wherein the vapor-liquid separators comprise hydrophobic demister pads. The compression device is driven mechanically, thermally, and combinations thereof. Source water further comprises de-oiling by removing at least a portion of total oil content (TOC) from source water prior to entering the heat exchanger. Source water further comprises the step of conventionally pre-treating source water prior to entering the heat exchanger. Source water further comprises de-scaling by removing at least a portion of scale prone species from source water prior to entering the heat exchanger. The scale prone species comprise magnesium, calcium, carbonates, sulfate, strontium, barium, radium, naturally occurring radioactive materials (NORM), silica, transition metals, and combinations thereof. Reject brine further comprises the step of recycling at least a portion of reject brine for mixing with source water prior to entering the heat exchanger.

The above described desalination train ([0016]) further comprises interrelating it in a brine-forward desalination system, wherein the brine-forward desalination system comprises a plurality of the desalination train arranged in series, in which each desalination train comprises at least the heat exchanger, the plurality of flashing stages arranged in series and at least the compression device, each of the desalination train produces distillate and reject brine, reject brine from each desalination train except a last desalination train in the brine-forward desalination system passes through to feed a next succeeding desalination train, thereby each desalination train progressively possesses a higher level of total dissolved solids (TDS) than a preceding desalination train, and reject brine from the last desalination train in the brine-forward desalination system is rejected at a level not exceeding 250,000 mg/L of TDS, thereby the brine forward desalination system is a multi-flashing system without supplying additional heat after the heat exchanger of each desalination train, and a multi-concentration system without supplying additional source water after a first heat exchanger of a first desalination train.

In another aspect, the present invention provides a method for de-salting source water. The inventive method comprising a desalination train wherein the desalination train comprises at least a heat exchanger, a plurality of flashing stages arranged in parallel and at least a compression device, feeding source water to be desalinated through the heat exchanger and then in parallel through the flashing stages to bring source water to a vaporizing temperature by maintaining the flashing stages at a lower pressure, source water at saturation temperature corresponding to the low pressure in the flashing stages or at a temperature higher than the saturation temperature corresponding to the lower pressure in the flashing stages so that at least a portion of source water flashes into vapor in each of the flashing stages, withdrawing vapor from each of the flashing stages, compressing at least a portion of the withdrawn vapor by the compression device, condensing the compressed vapor in the heat exchanger thereby producing distillate and heating source water before entering each of the flashing stages, and withdrawing unflashed source water from each of the flashing stages as reject brine of the desalination train.

The above described desalination train ([0019]) further comprises interrelating it in a brine-forward desalination system, wherein the brine-forward desalination system comprises a plurality of the desalination train arranged in series, in which each desalination train comprises at least the heat exchanger, the plurality of flashing stages arranged in parallel and at least the compression device, each of the desalination train produces distillate and reject brine, reject brine from each desalination train except a last desalination train in the brine-forward desalination system passes through to feed a next succeeding desalination train, thereby each desalination train progressively possesses a higher level of total dissolved solids (TDS) than a preceding desalination train, and reject brine from the last desalination train in the brine-forward desalination system is rejected at a level not exceeding 250,000 mg/L of TDS, thereby the brine forward desalination system is a multi-flashing system without supplying additional heat after the heat exchanger of each desalination train, and a multi-concentration system without supplying additional source water after a first heat exchanger of a first desalination train.

This invention is of particular interest in connection with applications such as, but not limited to, saline water desalination, hydrocarbons production (oil, gas, or a combination), contaminated groundwater from produced water disposal in injection wells and/or holding ponds, flue gas desulfurization, domestic and industrial wastewater treatment, advanced domestic and industrial wastewater treatment, mining, geothermal power generation, chlor-alkali, hydrocarbons-fired power plants, industrial boilers, steam generation, cooling towers, agricultural drainage water, mine drainage water, textile wastewater, landfill leachate, mineral slurry transport water, paper mills spent water, aluminum anodizing spent water, spent water from fertilizer production, spent water from textile production, spent water from all kinds of metals manufacturing, spent water from batteries manufacturing, salts production from natural brine, solar ponds and salts bitterns, and the like.

This invention is not restricted to use in connection with one particular application. This invention can be used, in general, for the effective de-salting (desalination) of source water. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The De-Salting Concept by Hydrophobic Membranes

Figure 7:
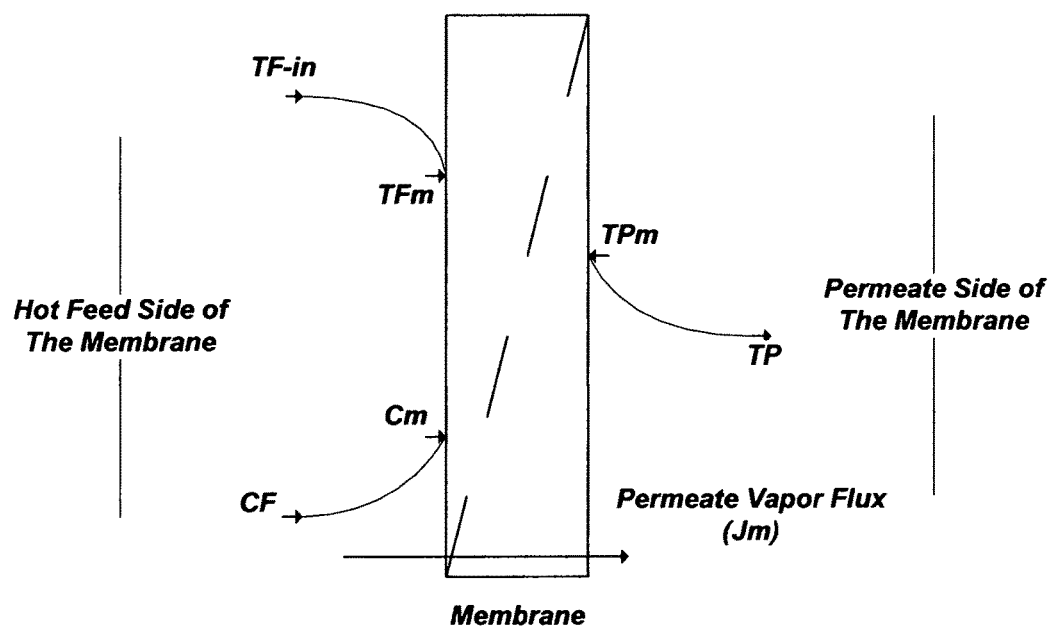
FIG. 7 illustrates concentration and temperature polarization profiles in hydrophobic membranes as a de-salting method.

Membrane Distillation (MD), for instance, refers to the transport of the vapor phase through pores of a hydrophobic membrane that separates two liquid solutions [e.g., U.S. Pat. Nos. 6,365,051; 6,663,778; 7,093,663; 7,392,848; 7,501,065; 7,789,159; 7,963,338; and 8,915,301]. The liquid solutions cannot enter the membrane's pores unless the applied pressure is greater than the specified "capillary or liquid entry" pressure for the porous partition of the membrane. In the absence of such a pressure, vapor-liquid interfaces are formed on both sides of the membrane's pores due to surface tension forces. Under these conditions, if a temperature difference is applied, a vapor pressure gradient will be created on both interfaces. Evaporation will take place at the hot membrane interface (feed), water vapor will transport through the membrane's pores with a convective and/or diffusion mechanism, and vapor condensation will take place at the cold side of the membrane interface (permeate). Thus, the net permeate vapor flux will be from the hot feed stream to the cold condensate stream. FIG. 7 shows a simplified schematic diagram for the flow direction in MD.

MD has several clear advantages compared to conventional pressure-driven hydrophilic membranes (e.g., RO and NF) or thermal-driven (e.g., MSF, MED, MVR and the like) processes. First, MD can take place at a very low pressure that may range from sub-atmospheric pressure to slightly above atmospheric pressure (e.g., 1.03 bar). This is contrary to RO that ought to be operated at high pressures (e.g., 60-80 bar) to exceed the natural osmotic pressure of source water such as seawater (e.g., the osmotic pressure of normal seawater is about 30 bar), which require a significant pumping power in contrast to MID.

Second, MD may be conducted at temperatures that are significantly lower than the normal boiling point of water. Any form of waste heat (e.g., existing low temperature gradients typically available in processing plants, hot oilfields produced water) or low grade energy sources (e.g., wind, solar, geothermal, solar ponds and combinations) may be used.

Third, the MID permeate stream (distillate) from any source water containing non-volatile ions is an ultra-pure. Entrainment of dissolved ions in the permeate stream, which is an issue with RO and NF membranes, is thus negligible.

Fourth, the evaporation surface of MD can be configured similar to the available various pressure-driven hydrophilic membranes (e.g., hollow fiber, spiral wound and flat sheet configurations). The modularity of MD thus allows the ease of adding processing capacity as needed. The natures of bulky conventional thermal-driven processes (MSF, MED, MVR and the like) prohibit furnishing the flexibility and simplicity that MD provides.

However, the apparent simplicity of MD obscures complex and simultaneous mass and heat transfer interactions. The mass water vapor flux in MD is a function of the "membrane permeability coefficient" ($K_m$) and the vapor pressure difference across the membrane:

$$J_m = K_m [p_{Fm}^s (T_{Fm}) - p_P] \quad (1)$$

where $p_{Fm}^s$ is the saturated vapor pressure of the hot feed stream at the membrane surface temperature ($T_{Fm}$) rather than the bulk (inlet) feed temperature ($T_F$), and $p_P$ is the permeate stream pressure. $K_m$ is a function of the membrane structure such as porosity ($\varepsilon$), pore size radius (r), thickness ($\delta$), and tortuosity ($\chi$):

$$K_m = \frac{2\varepsilon r}{3\chi\delta} \frac{1}{RT} \sqrt{\frac{8RT}{\pi}} \quad (2)$$

$T_{Fm}$, as the driving force for the water vapor flux across the membrane, not only affects the vapor-liquid equilibrium in the feed stream but also affects the hydrodynamics in the feed stream liquid phase since its dependent on salts concentrations at the membrane surface.

As evaporation in MD takes place, the viscosity of a saline feed stream increases with increasing salts concentrations. This would elevate the osmotic pressure, depress the vapor pressure, and alter heat and mass transfer coefficients across the membrane boundary layers. The saturated vapor pressure of a saline stream can be related to its osmotic pressure as follows:

$$p_{Fm}^s = \frac{p^o}{\exp\left[\frac{\Pi_{Fm} \tilde{v}_w}{RT_{Fm}}\right]} \quad (3)$$

where at $T_{Fm}$, $p_{Fm}^s$ is the saturated vapor pressure of a saline stream (mmHg), $p^o$ is the vapor pressure of pure water (mmHg), $\Pi_{Fm}$ is the osmotic pressure of a saline stream (psi), $\tilde{v}_w$ is the water molar volume (L/gmol), and R is the ideal gas constant (L psi/gmol K).

$p^o$ can be accurately estimated using Antoine equation. The osmotic pressure ($\Pi_{Fm}$) of a saline stream can be estimated as follows:

$$\Pi = 1.19 T_{Fm} \Sigma M_i \quad (4)$$

where $M_i$ is the molar concentration of individual ions (mol/L).

Eqs. (1) to (3) imply that in order to enhance or achieve an acceptable level of the vapor flux, the value of either $K_m$, or $T_{Fm}$, or both values must be increased. As given in Eq. (2), the membrane structure is the key to optimize $K_m$. The $K_m$ value of hydrophobic membranes is typically very low (e.g., about 0.2 Kg/m²·hr·mmHg) to prevent water (liquid) from passing through the membrane's pores. A slight increase in the $K_m$ value is possible, which could drastically improve vapor flux, but it should not be at the expense of losing the membrane hydrophobicity. As such, a balance ought to be stricken between improving the value of $K_m$ and maintaining the membrane hydrophobicity.

$K_m$ is also, to some degree, temperature dependent (decreases by 3% with a 10° C. increase in the mean temperature). The molecular mean free path for water vapor at 60° C. is about 0.3 µm. If convective transport is dominant across the membrane, the controlling factor will be the size of the membrane's pores. If diffusive transport is dominant; however, the controlling factor will be the average mole fraction of air present within the membrane's pores. Using an inappropriate small size of membrane's pores combined with an increase in the feed stream temperature range (e.g., above 60° C.) could subsequently lead to an unintended reduction in $K_m$.

The key to increasing the value $T_{Fm}$ lies within: (1) the thermal conductivity of the hydrophobic membrane and the nature of the condensation method on the permeate side of the membrane; (2) the thermal stability of the hydrophobic membrane, the characteristics of the flow regime, and the operating conditions (e.g., the feed stream's temperature and flow rate, and the permeate stream's pressure); and (3) controlling scaling compounds in (if not removing scaling compounds from) the feed stream.

The Permeate Water Vapor Condensation Method

The thermal mechanism in the MD hot feed stream takes place in two forms. The first form is the latent heat, which is utilized to evaporate water at the feed side (hot) of the membrane interface. The second form is the conductive heat, which is lost in transferring water vapor through the membrane layer to the permeate side (cold) of the membrane interface. For effective MD, the extent of the conductive heat loss must be minimized.

Figure 8:
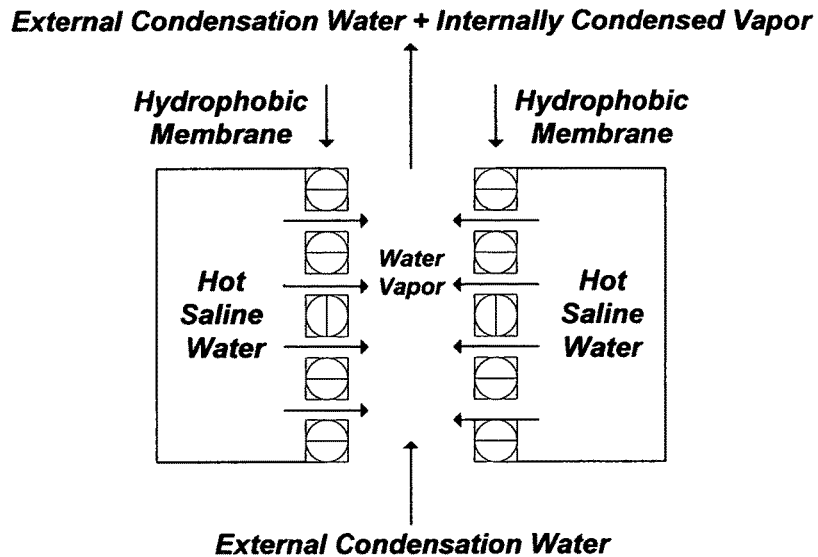
FIG. 8 illustrates an internal vapor condensation (Configuration A) and an external vapor condensation (Configuration B) of de-salting by hydrophobic membranes.
Figure 8:
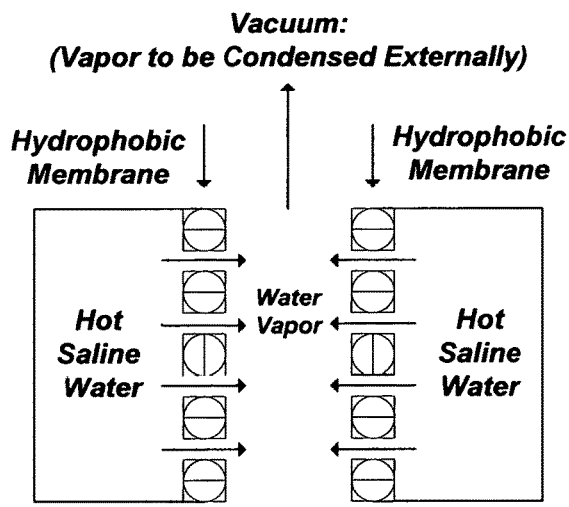

The permeate vapor condensation step can be accomplished internally (within the membrane module) or externally outside the membrane module. As shown in FIG. 8 (Configuration A), one of the methods to conduct the internal condensation is by directly contacting, for example, a potable water stream at ambient temperature along the permeate surface of the hydrophobic membrane to condense vapor. Since the vapor pressure of the potable water stream at the condensation-membrane interface (e.g., the cold side of the membrane) is much lower than the vapor pressure of the hot water feed stream steam at the evaporation-membrane interface, vapor is transferred from the hot stream through the membrane's pores to the flowing cold potable water stream. However, the extent of the conductive heat loss in this "Direct Contact Membrane distillation" (DCMD) method is considerable.

As shown in FIG. 8 (Configuration B); however, an external condensation method can be achieved under reduced pressure (vacuum) to withdraw vapor from the hot-side of the membrane interface and condense it in an external condenser outside the membrane module. In this "Vacuum Membrane Distillation (VMD) method, and when vapor-liquid equilibrium is favorable, the potential for drastically achieving higher vapor flux and substantially minimizing the extent of conductive heat loss from the hot feed stream is attainable.

Operating Conditions

One of the major advantages of VIVID (FIG. 8; Configuration B) relative to DCMD (FIG. 8; Configuration A) is that the conductive heat transfer across the membrane layer is nearly negligible. This is attributed to the applied vacuum that allows a very low gas pressure on the permeate side of the membrane and prevents the presence of trapped air in the membrane's pores (e.g., reduces resistance to vapor flow). As such, the heat flux ($J_h$) at the hot feed stream side of the membrane interface can be expressed as follows:

$$J_h K_h [T_{F-In} - T_{Fm}] \quad (5)$$

where $K_h$ is the "membrane heat transfer coefficient" that can be estimated from the Nusselt number, and $T_{F-in}$ is the inlet hot feed stream temperature entering the membrane module. Since the value of $T_{Fm}$ cannot practically be determined, $J_h$ can be related to the practically measurable temperature drop between the inlet and outlet of the hot feed stream through the membrane module as follows:

$$J_h = \frac{Q_F}{A_m} c_p [T_{F-in} - T_{F-out}] \quad (6)$$

where $Q_F$ is the hot feed stream flow rate, $A_m$ is the total membrane area, $c_p$, is the liquid phase heat capacity, and $T_{F-out}$ is the feed stream temperature leaving the membrane module. Knowing the value of $J_h$ from Eq. (6) along with roughly estimating the value of $K_h$ from an appropriate Nusselt number, the hot feed stream at the membrane surface temperature ($T_{Fm}$), which is responsible for the temperature polarization phenomenon, can be predicted.

The heat flux is related to the mass vapor flux as follows:

$$J_h = J_m \Delta H_v \quad (7)$$

where $\Delta H_v$ is the water heat of vaporization. For a laminar flow, it is fundamentally known that $K_h$ in a cross flow configuration (e.g., a saline stream flows in the shell side of the hollow fiber module and vacuum in the tube side) is much higher than its correspondent value in a parallel flow configuration (e.g., a saline stream flows in the tube side of the hollow fiber module and vacuum in the shell side). Thus, the cross flow configuration in MD is essential to achieve higher permeate vapor flux.

According to Eq. (6), the flow rate and temperature in the feed stream have appreciable effects on the permeate vapor flux. At a given inlet feed stream temperature, increasing the feed stream flow rate would increase both $K_h$ and $T_{Fm}$. Another benefit for applying a higher feed flow rate is reducing the residence time of the hot feed stream passing through the membrane module, thereby appreciably minimizing the temperature drop in the outlet feed stream. This is critical for the thermal efficiency, especially in staging properly configured hydrophobic membranes (e.g., VMD) as a de-salting method.

Methods to De-Salt Source Water

As re-stressed above, the combination of the multistage flash principle with the vapor compression principle is desirable but has not been attained in a practical manner. This invention recognizes the need for combining such principles to provide effective, simple, flexible and economical de-salting (desalination) methods.

Figure 9:
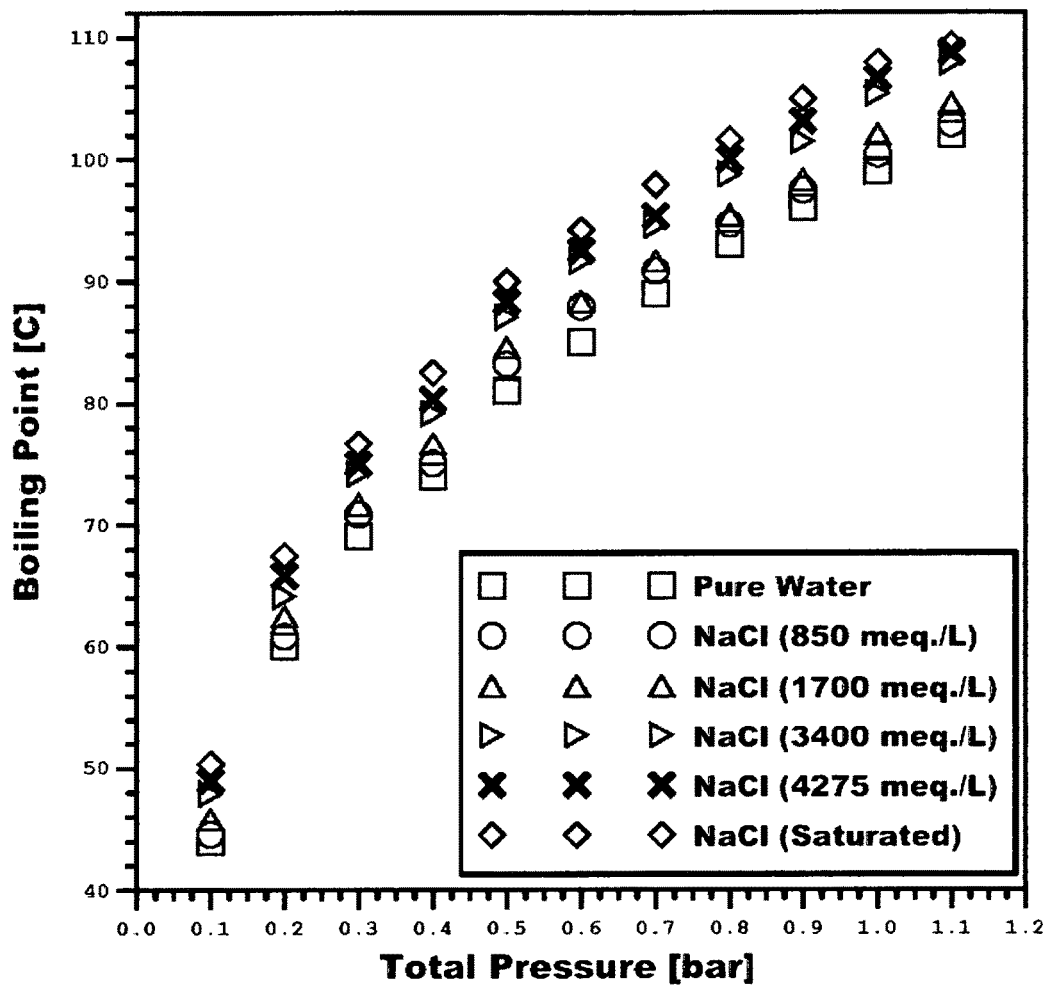
FIG. 9 illustrates the boiling points of pure water and water containing sodium chloride versus total pressures.

Boiling occurs when the vapor pressure of water is equal to the total pressure on the water surface. FIG. 9 shows the boiling points of pure water and water containing sodium chloride (an approximation to a saline stream or a concentrated saline stream) at different concentrations as a function of total pressures. Under atmospheric pressure (1.01 bar), pure water boils at 100° C. whereas water saturated with sodium chloride boils at 109.5° C. On the other hand, pure water boils at 44° C. and water saturated with sodium chloride boils at 50.3° C. under a total pressure of 0.1 bar absolute. When pressure is reduced, the boiling point is correspondingly reduced. As such, vapor can be produced from water (liquid) when water is at its boiling point, either by directly adding heat (boiling) or by reducing pressure (flashing).

Figure 10A:
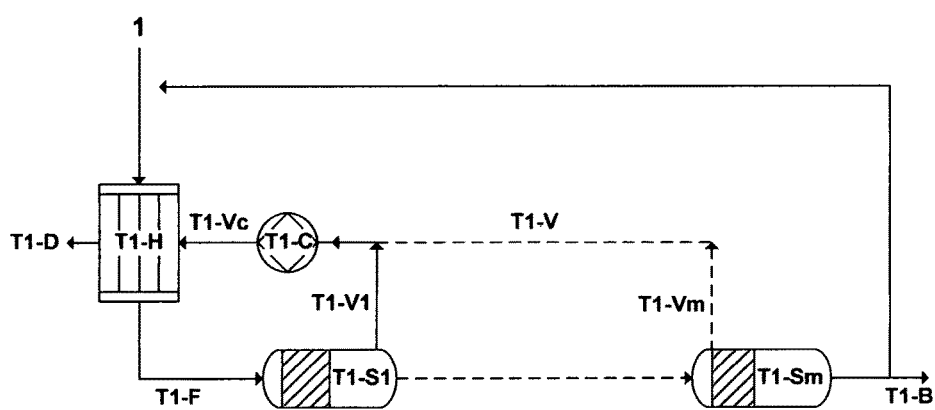
FIG. 10A illustrates a possible flow diagram for the inventive de-salting train.

FIG. 10A illustrates, as an example, an oversimplified flow diagram for the inventive method for desalinating source water by combining the multi-stage flash and vapor compression principles in a desalination train. The inventive method, as shown in FIG. 10A, comprising a desalination train wherein the desalination train comprises at least a heat exchanger [T1-H], a plurality of flashing stages arranged in series [T1-S1 to T1-Sm] and at least a compression device [T1-C]. Here, the desalination train is based on flashing stages arranged in series, wherein each flashing stage possesses a lower pressure to lower the boiling point of source water than a preceding flashing stage. This allows successive reduction of the boiling point of water as it gets more concentrated in going down the flashing stages.

The notations "T1", "T1-H", "T1-S1 to T1-Sm", "T1-F", "T1-V1 to T1-Vm", "T1-C", "T1-V", "T1-Vc", "T1-D" and "T1-B" refer to, respectively, the desalination train, the heat exchanger of the desalination train, the number of flashing stages in the desalination train, the heated source water to feed the first flashing stage of the desalination train, the flashed vapor in each of the flashing stages of the desalination train, the compression device of the desalination train, the withdrawn vapor from the flashing stages of the desalination train, the compressed vapor by the compression device of the desalination train, the produced distillate of the desalination train, and reject brine of the desalination train.

To increase the thermal efficiency (heat recovery) of this single desalination train (FIG. 10A), the number of flashing stages can be increased. As such, the number of flashing stages [S1 to Sm] in series can be extended from "1" to "m" stages, which indicated in FIG. 10A by dotted lines. The pressure in each flashing stage is lower than the pressure in a preceding flashing stage. The minimum pressure and temperature in a last flashing stage ("Sm") of the desalination train are dictated at least by the volume of recoverable vapor and heat rejection considerations of reject brine. The number of flashing stages thus controls the amount of heat recovery possible within the desalination train, which, in turn, controls the amount of external energy required (thereby the size of the compression device). Here, the compressor device serves as an open system "heat pump" that requires only enough energy to compress the vapor since it continuously reuses latent heat.

As shown in FIG. 10A, source water [1] to be desalinated is fed through the heat exchanger [T1-H] and then [T1-F] in succession through the flashing stages [T1-S1 to T1-Sm] to bring water to a vaporizing temperature by maintaining the flashing stages at progressively lower pressures in the direction of going down the flashing stages (from T1-S1 to T1-Sm), thereby water at saturation temperature corresponding to the pressure in a flashing stage flows to a next succeeding flashing stage at a lower pressure and arrives in the next flashing stage at a temperature higher than the saturation temperature corresponding to the lower pressure in the next flashing stage so that at least a portion of water flashes into vapor [T1-V1 to T1-Vm] in each of the flashing stages [T1-S1 to T1-Sm]. The vapor [T1-V1 to T1-Vm] from each of the flashing stages is withdrawn, and at least a portion of the withdrawn vapor [T1-V] is compressed by the compression device [T1-C]. The compressed vapor [T1-Vc] is condensed in the heat exchanger [T1-H], thereby producing distillate [T1-D] as well as heating source water [1] before entering [T1-F] a first flashing stage [T1-S1] of the desalination train. Here, the latent heats of heating and condensing fluids are nearly completely equal. Thus, the sensible heat of the compressed vapor [T1-V] upon cooling in the heat exchanger [T1-H] is converted to latent heat, and upon condensation on the tubes of the heat exchanger [T1-H] (to produce distillate [T1-D]) is added as sensible heat to source water [T1-F]. Unflashed water (brine) is rejected from a last flashing stage [T1-Sm] of the desalination train as reject brine [T1-B].

The flashing stages [T1-S1 to T1-Sm] comprise hydrophobic membranes under reduced pressure.

The flashing stage [T1-S1 to T1-Sm] further comprise simple vapor-liquid separators (flash tanks) under reduced pressure, wherein the vapor-liquid separators comprise hydrophobic demister pads. Here, hydrophobic membranes (hydrophobic demister pads) capture water droplets that entrain with flashed vapor.

The compression device [C-1] is selected from the group consisting of a mechanically driven compression device, a thermally driven compression device, and combinations thereof.

Source water [1] further comprises de-oiling by removing at least a portion of total oil content (TOC) from source water [1] prior to entering the heat exchanger [T1-H].

Source water [1] further comprises the step of conventionally pre-treating source water [1] prior to entering the heat exchanger [H-1]. Source water pre-treatment conventionally comprises at least adding an acid to control alkaline scale along with de-carbonation, and a scale inhibitor to delay sulfate scale.

Source water [1] further comprises de-scaling by removing at least a portion of scale prone species from source water [1] prior to entering the heat exchanger [H-1]. Scale prone species comprise magnesium, calcium, carbonates (carbonate, bicarbonate, carbonic acid and carbon dioxide), sulfate, strontium, barium, radium, naturally occurring radioactive materials (NORM; radium's decay series), silica, transition metals, and combinations thereof.

Reject brine [T1-B] further comprises the step of recycling at least a portion of reject brine [T1-B] for mixing with source water [1] prior to entering the heat exchanger [T1-H].

Figure 10B:
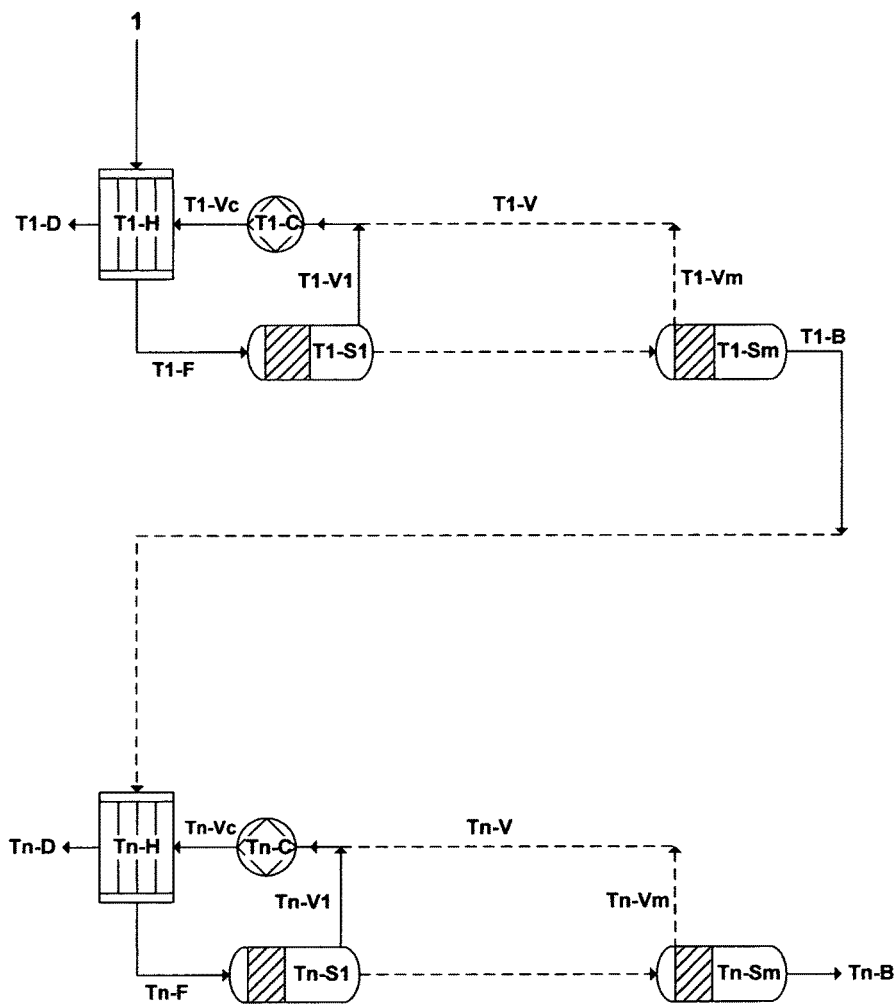
FIG. 10B illustrates a possible flow diagram for the inventive Brine-Forward (BF) de-salting system.

The inventive desalination train as given in FIG. 10A and described above further comprises interrelating a plurality of such a desalination train in what I coined a brine-forward desalination system as shown in FIG. 10B. The inventive brine-forward desalination system comprises a plurality of desalination trains arranged in series, in which each of the desalination train, as described above, comprises at least a heat exchanger, plurality of flashing stages arranged in series, and at least a compression device. As such, the number of desalination trains [T1 to Tn] in series can be extended from "1" to "n" trains, which indicated in FIG. 10B by dotted lines. For example, the last desalination train, as shown in FIG. 10B, comprises at least a heat exchanger [Tn-H], a plurality of flashing stages arranged in series [Tn-S1 to Tn-Sm], and at least a compression device [Tn-C]. Each of the desalination train produces distillate and reject brine (as given in FIG. 10A and described above). However, reject brine from each of the desalination train except a last desalination train in the brine-forward desalination system passes through to feed a next succeeding desalination train, thereby each of the desalination train progressively possesses a higher level of total dissolved solids (TDS) than a preceding desalination train, and reject brine from the last desalination train in the brine-forward desalination system may be rejected at a level not exceeding 250,000 mg/L of TDS. De-scaling of source water [1], as explained above [0061], would facilitate the rejection of brine from the last desalination train at a TDS level of about 250,000 mg/L since de-scaled source water would contain nearly only sodium chloride. De-scaling thus controls the number of desalination trains in the brine-forward desalination system, which, in turn, controls the volume and TDS level of reject brine resulting from the brine-forward desalination system. As such, the inventive brine forward desalination system is a multi-flashing system without supplying additional heat after a heat exchanger of each desalination train, and a multi-concentration system without supplying additional source water after a heat exchanger of a first desalination train.

Figure 11A:
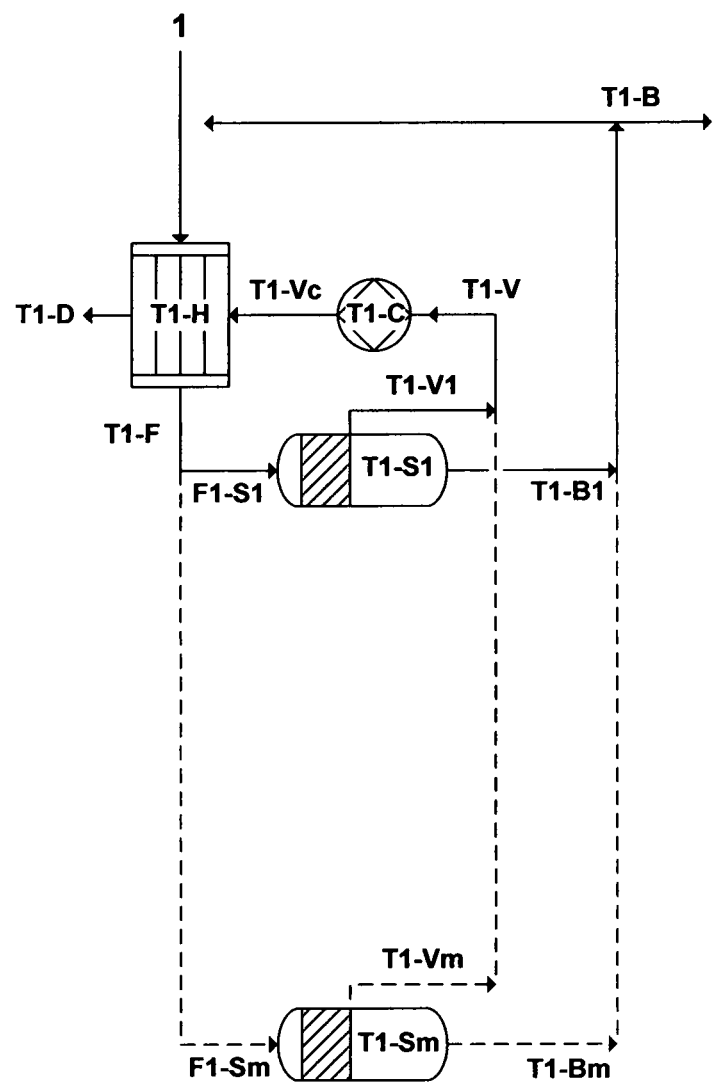
FIG. 11A illustrates another possible flow diagram for the inventive de-salting train.

Alternatively, FIG. 11A illustrates another oversimplified flow diagram for the inventive method for desalinating source water by combining the multi-stage flash and vapor compression principles in a desalination train. The inventive method, as shown in FIG. 11A, comprising a desalination train wherein the desalination train comprises at least a heat exchanger [T1-H], a plurality of flashing stages arranged in parallel [T1-S1 to T1-Sm] and at least a compression device [T1-C]. Here, the desalination train is based on flashing stages arranged in parallel, thereby heated source water [T1-F] by the heat exchanger [T1-H] is distributed [F1-S1 to F1-Sm] among the flashing stages [T1-S1 to T1-Sm]. The flashing stages are, in turn, maintained at a lower pressure wherein water at saturation temperature corresponding to the low pressure in the flashing stages or at a temperature higher than the saturation temperature corresponding to the lower pressure in the flashing stages so that at least a portion of water flashes into vapor [T1-V1 to T1-Vm] in each of the flashing stages [T1-S1 to T1-Sm]. As such, the arrangement of the flashing stages in parallel: (1) reduces the amount of heat that has to be added to the desalination train via the compression device; and (2) allows maximizing vapor recovery from the flashing stages since no constraints (e.g., temperature drop in each flashing stage, and total flash range) on lowering the pressure in each flashing stage (unlike the arrangement of the flashing stages in series).

As shown in FIG. 11A, source water [1] to be desalinated is fed through the heat exchanger [T1-H] and then [T1-F] in parallel [F1-S1 to F1-Sm] through the flashing stages [T1-S1 to T1-Sm] to bring water to a vaporizing temperature by maintaining the flashing stages at a similar lower pressure wherein water at saturation temperature corresponding to the low pressure in the flashing stages or at a temperature higher than the saturation temperature corresponding to the lower pressure in the flashing stages so that at least a portion of water flashes into vapor [T1-V1 to T1-Vm] in each of the flashing stages [T1-S1 to T1-Sm]. The vapor [T1-V1 to T1-Vm] from each of the flashing stages is withdrawn, and at least a portion of the withdrawn vapor [T1-V] is compressed by the compression device [T1-C]. The compressed vapor [T1-Vc] is then condensed in the heat exchanger [T1-H], thereby producing distillate [T1-1)] and heating source water [1] before entering [T1-F] each [F1-S1 to F1-Sm] of the flashing stages [T1-S1 to T1-Sm] of the desalination train. Unflashed water (brine) [T1-B1 to T1-Bm] is rejected from each of the flashing stages [T1-S1 to T1-Sm] and combined as reject brine [T1-B] of the desalination train.

Figure 11B:
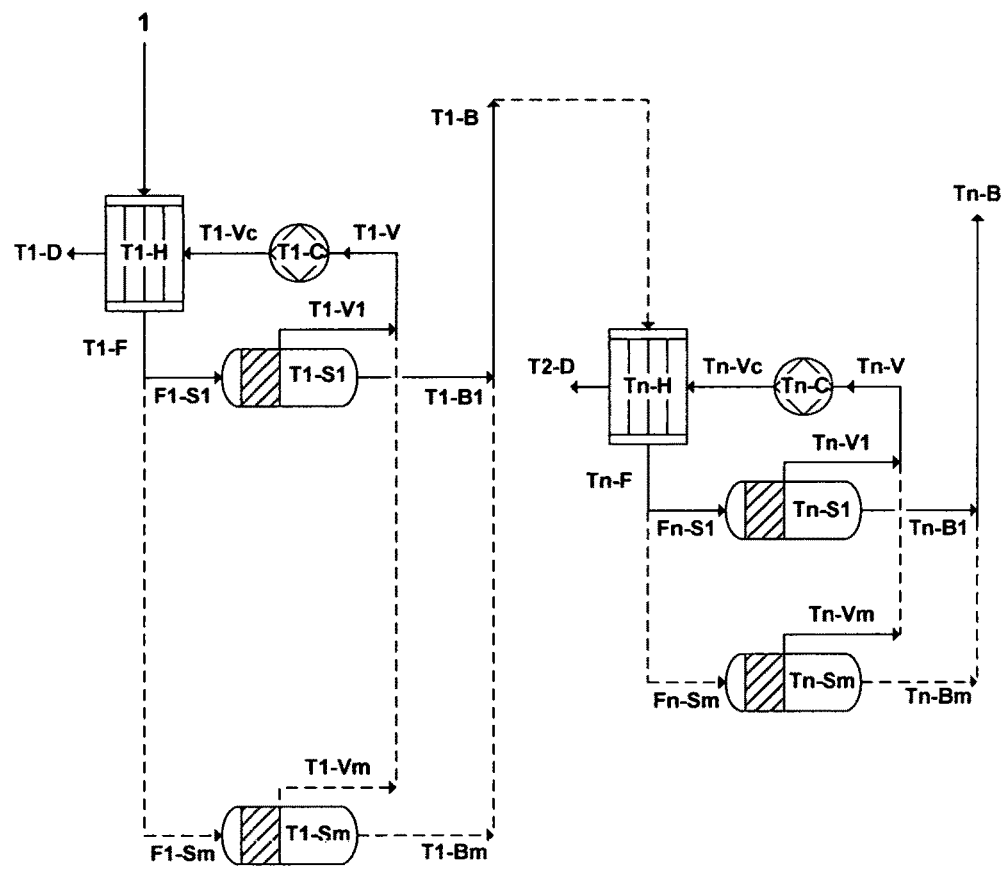
FIG. 11B illustrates another possible flow diagram for the inventive Brine-Forward (BF) de-salting system.

The inventive desalination train as given in FIG. 11A and described above further comprises interrelating a plurality of desalination trains in what I coined a brine-forward desalination system as shown in FIG. 11B. The inventive brine-forward desalination system comprises a plurality of desalination trains arranged in series, in which each of the desalination train, as described above (FIG. 11A), comprises at least the heat exchanger, the plurality of flashing stages arranged in parallel, and at least the compression device. As such, the number of desalination trains [T1 to Tn] in series can be extended from "1" to "n" trains, which indicated in FIG. 11B by dotted lines. For example, the last desalination train, as shown in FIG. 11B, comprises at least a heat exchanger [Tn-H], a plurality of flashing stages arranged in parallel [Tn-S1 to Tn-Sm], and at least a compression device [Tn-C]. Each of the desalination train produces distillate and reject brine (as given in FIG. 11A and described above). However, reject brine from each of the desalination train except a last desalination train in the brine-forward desalination system passes through to feed a next succeeding desalination train, thereby each of the desalination train progressively possesses a higher level of total dissolved solids (TDS) than a preceding desalination train, and reject brine from the last desalination train in the brine-forward desalination system may be rejected at a level not exceeding 250,000 mg/L of TDS. Thus, the inventive brine forward desalination system is a multi-flashing system without supplying additional heat after a heat exchanger of each desalination train, and a multi-concentration system without supplying additional source water after a first heat exchanger of a first desalination train.

Figure 1:
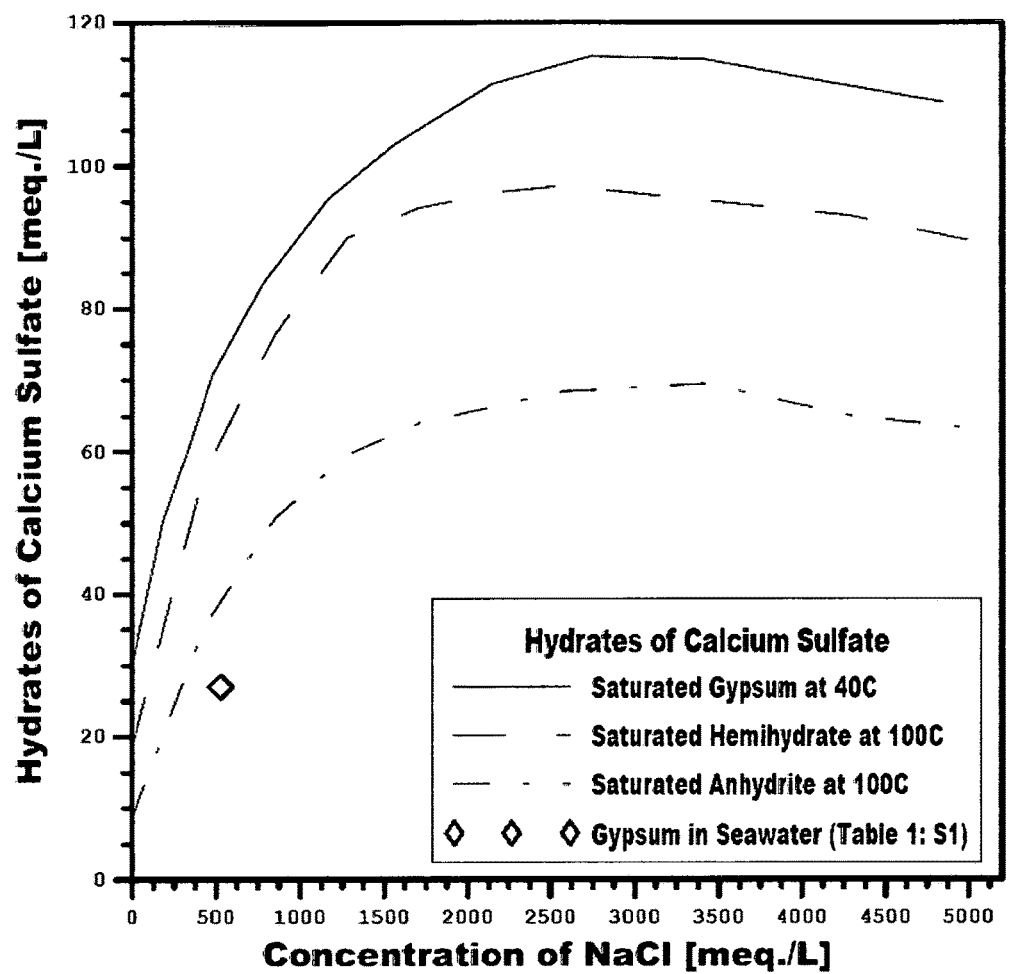
FIG. 1 illustrates the saturation limits of calcium sulfate hydrates as a function of sodium chloride concentrations along with gypsum concentration in seawater.
Figure 2:
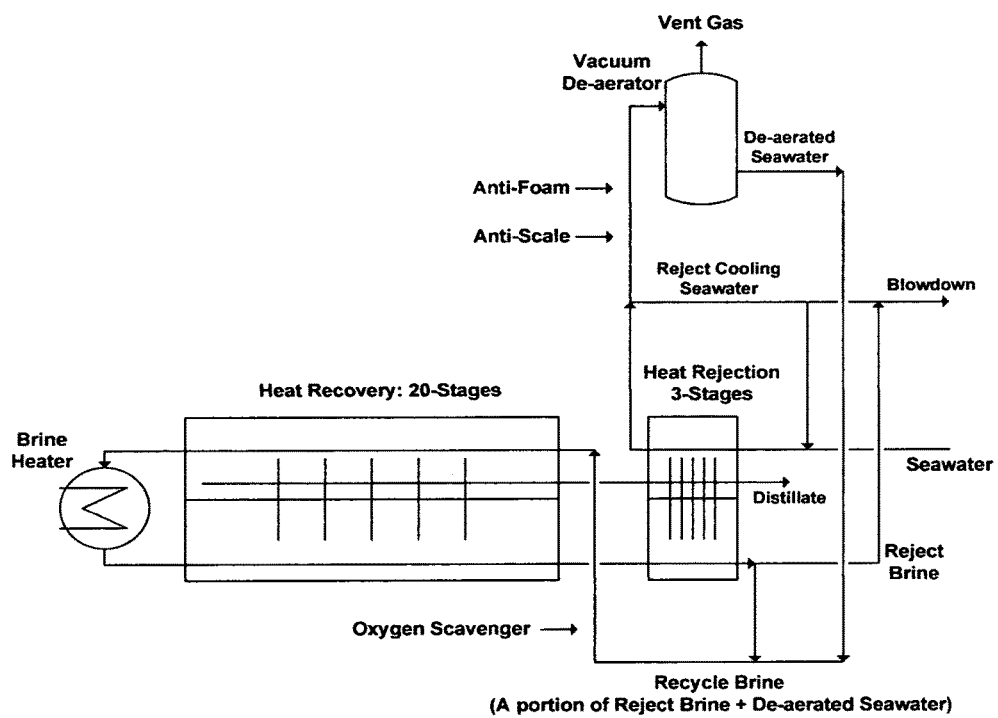
FIG. 2 illustrates a simplified configuration for a single conventional RB-MSF desalination train to de-salt seawater.
Figure 3:
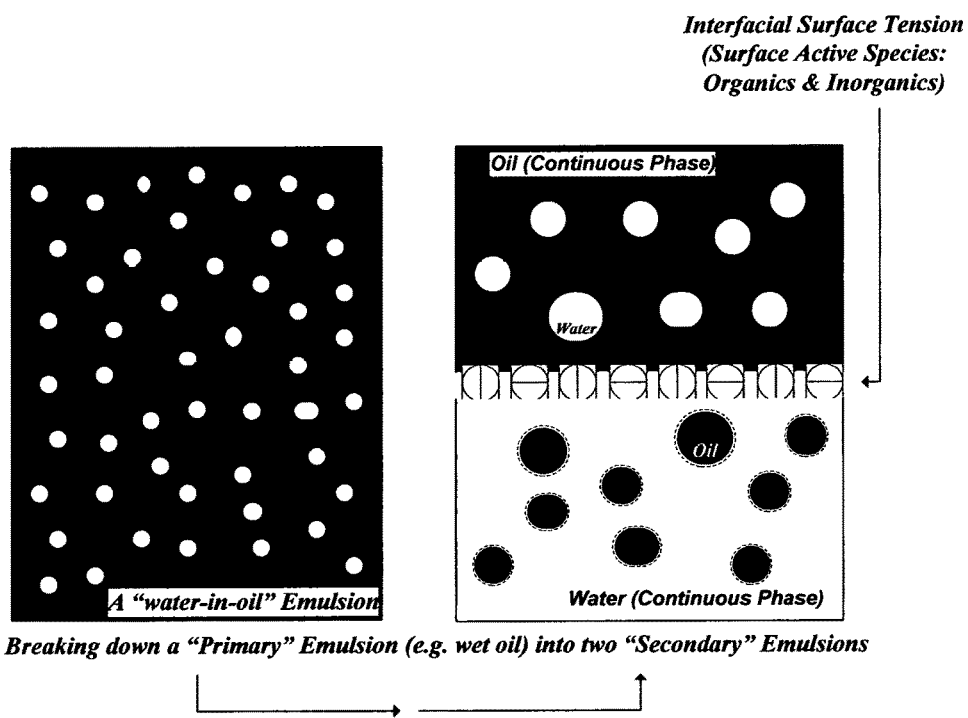
FIG. 3 illustrates the breakdown of a primary (e.g., wet oil) emulsion into two secondary emulsions.
Figure 4:
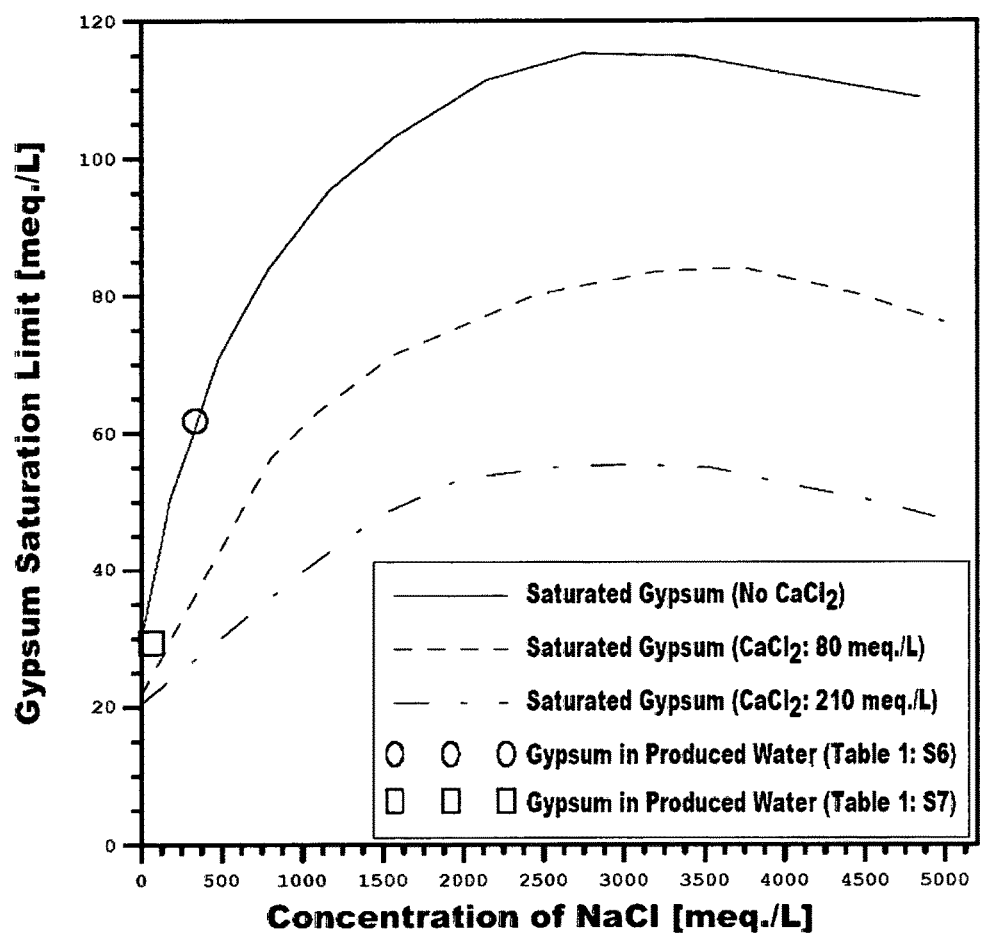
FIG. 4 illustrates the saturation limits of gypsum as a function of the concentrations of sodium chloride and calcium chloride along with gypsum concentration in some produced water.

As set out above, there are several distinct features for the inventive de-salting methods. First, the latent heat from the evaporation side (evaporating vapor) is recycled to the condensing side (source water) of the desalination train. The invention aims at recovering the latent heat from evaporating vapor rather than rejecting this latent heat in cooling water or a water cooled condenser. This is in contrast to, for example, a conventional MSF desalination train (FIG. 2) wherein, as explained in paragraph [0003], the latent heat from evaporating vapor in a heat rejection section is wasted in a water body (e.g., by using and rejecting an enormous amount of cooling seawater).

Figure 5:
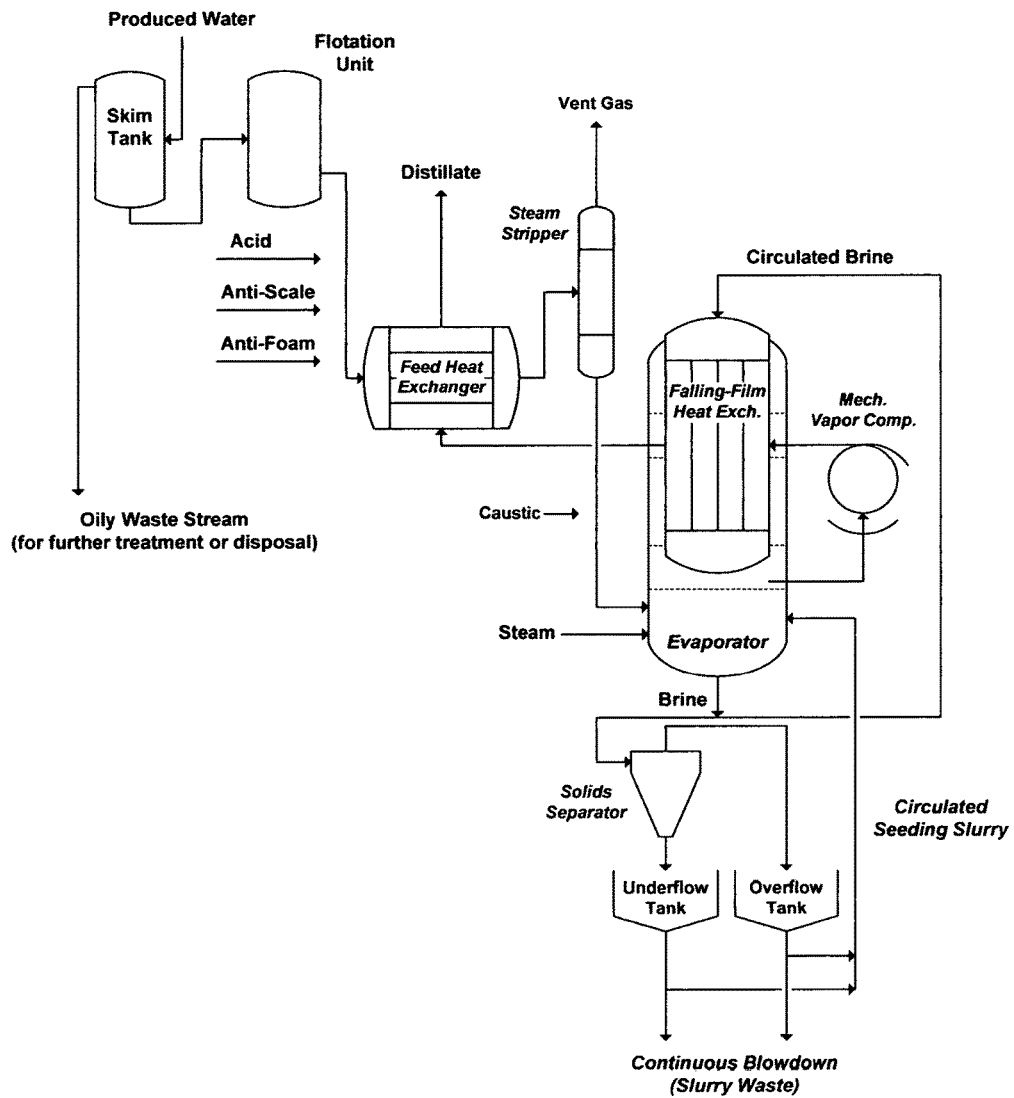
FIG. 5 illustrates a flow diagram for de-oiling as well as de-salting produced water above normal boiling by a conventional single stage MVR.
Figure 6:
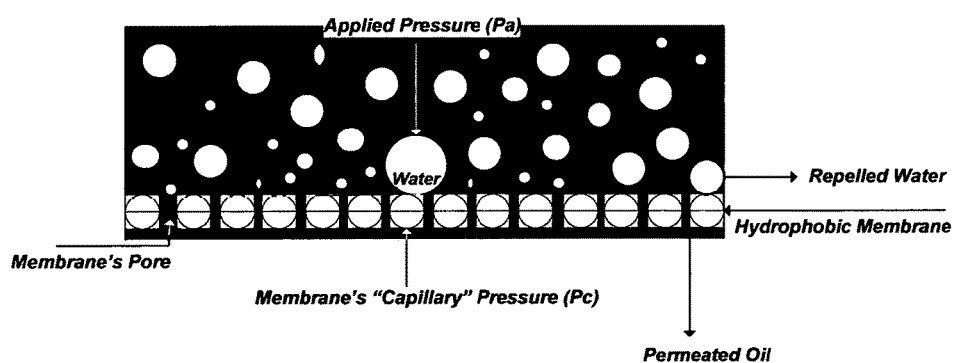
FIG. 6 illustrates the water de-oiling and oil de-watering concept by hydrophobic membranes.

Second, the invention also aims at eliminating or greatly reducing the use of steam as the primary heat energy. Instead, this invention utilizes a compression device as a heat pump that can be driven mechanically (e.g., a fan, a blower, a compressor, or a combination), thermally (e.g., a steam jet), and combinations. The energy input required by the compression device is equal to the energy required to raise the vapor pressure (thereby the vapor saturation temperature) by an amount equivalent to the thermal driving force across the flashing stages. As such, the energy input per unit mass of distillate is low since it is mostly for driving the compression device, and the heat to be rejected from the inventive desalination train is also low since it is equal to the energy input of the compression device. This is in contrast to, for example, a conventional RB-MSF desalination train (FIG. 2), which is based on utilizing a brine heater as a sole source of heat energy, stepwise degradation of heat energy in a heat recovery section, and then exhausting the latent heat of evaporating vapor in a heat rejection section to waste in reject cooling seawater. This is also in contrast to, for example, a conventional evaporator (FIG. 5), as also explained in paragraphs [0007]-[0010], wherein neither the flash principle can be applied (e.g., a single stage evaporator operated above the normal boiling point of brine) nor can be the vapor compression principle effective (e.g., a rigid design with very an: (1) inefficient use of the operating principle; (2) uneconomical uses of both steam and mechanical power; and (3) expensive use of costly alloy (e.g., titanium) tubes and construction materials).

Third, the inventive de-salting methods with flashing stages comprise hydrophobic membranes operate at significantly lower temperatures (e.g., at or below 85° C.). This is in contrast to a conventional single boiling evaporator (FIG. 5) and a conventional RB-MSF desalination train (FIG. 2) that operate at top brine temperatures of about, respectively, 116° C. and 110° C.

Fourth, the flashing stages in the inventive de-salting methods comprise hydrophobic membranes, which are characterized with ease of fabrication, modification and scale-up. Such inventive methods also operate at a significantly higher level of surface area to volume than any other de-salting method. These two factors lead to a dramatic reduction in size and cost of construction materials. This is in contrast to, for example, the two conventional RB-MSF desalination plants (as described in paragraphs [0003]-[0005]) that required about 15,000 miles of alloy tubes. Here, the world's ever-increasing demands for drinking water will not be met even if conventional MSF desalination plants are presumably utilized to provide drinking water since the available supply of alloys (e.g., copper-nickel, aluminum-brass, or titanium) may not be sufficient. A very large saving in the cost of producing drinking water will thus result with the inventive de-salting methods since they are compact, modular and made out of cheaper materials (e.g., polymers, inorganic composites (ceramic), and polymers and glass lining materials).

TABLE 1

Samples of Source Water.

| Ion (meq./L) | S1 | S2 | S3 | S4 | S5 | S6 | S7 |
|---|---|---|---|---|---|---|---|
| $Na^+$ | 529.1 | 873.5 | 1,091.4 | 692.6 | 1613.8 | 337.0 | 59.2 |
| $K^+$ | 10.7 | 26.2 | 18.9 | 12.1 | 32.6 | 9.7 | 3.1 |
| $Mg^{+2}$ | 125.9 | 191.7 | 209.6 | 332.1 | 384.0 | 49.4 | 22.3 |
| $Ca^{+2}$ | 27 | 41.9 | 47.2 | 52.5 | 82.4 | 117.5 | 55.1 |
| $Sr^{+2}$ | 0.2 | 0.5 | | 0.5 | | 1.6 | 0.7 |
| $Cl^-$ | 623 | 1,020.1 | 1,181.2 | 823.5 | 1900.2 | 462.6 | 96.5 |
| $HCO_3^-$ | 2.3 | 4.2 | 3.4 | 8.2 | | 4.0 | 26.6 |
| $SO_4^{-2}$ | 64.6 | 106.2 | 114.6 | 251.6 | 197.0 | 61.5 | 28.1 |
| $MgCl_2/\Sigma\ Mg$ | 0.68 | 0.67 | 0.68 | 0.38 | 0.70 | | |
| $Ca^{+2}/SO_4^{-2}$ | 0.42 | 0.40 | 0.41 | 0.21 | 0.42 | 1.91 | 1.96 |
| $Ca^{+2}/Mg^{+2}$ | 0.21 | 0.22 | 0.23 | 0.16 | 0.21 | 2.38 | 2.18 |
| $Mg^{+2}/SO_4^{-2}$ | 1.95 | 1.81 | 1.83 | 1.32 | 1.95 | 0.80 | 0.80 |

S1: Seawater; S2: RO reject stream from seawater treatment at 43% overall recovery ratio; S3: RB-MSF reject brine from seawater treatment; S4: NF reject stream from seawater treatment at 75% overall recovery ratio; S5: reject stream from flue gas de-sulfurization (spent seawater makeup); S6: produced water; S7: produced water; $\Sigma\ Mg = MgCl_2 + MgSO_4$.

What is claimed is:

1. A method for desalinating a source of water, said method comprising: feeding said source of water to at least one desalination train comprising at least one heat exchanger, a plurality of flashing stages arranged in series and at least one compression device; wherein said source of water to be desalinated passes through said heat exchanger and through said plurality of flashing stages in succession to heat the water to a vaporization temperature by maintaining said series of flashing stages at progressively lower pressures in a downward direction; wherein said source of water is at least at a saturation temperature corresponding to the pressure in said flashing stage, and flows to a next succeeding flashing stage which is at a lower pressure successively and wherein the input into said next flashing stage is at a temperature higher than the saturation temperature corresponding to said lower pressure in said next flashing stage; and wherein at a least a portion of said source of water flashes into vapor in each of said flashing stages; withdrawing said vapor from each of said flashing stages, and compressing at least a portion of said withdrawn vapor by said compression device and condensing the compressed vapor in said heat exchanger thereby producing a distillate stream; and wherein said source of water is heated before entering said first flashing stage of said desalination train; and withdrawing non-flashed water from said last flashing stage of said desalination train as a reject brine stream.

2. The method of claim 1, wherein said flashing stages comprise hydrophobic membranes under reduced pressure.

3. The method of claim 1, wherein said flashing stages further comprise vapor-liquid separators under reduced pressure, wherein said vapor-liquid separators comprise hydrophobic demister pads.

4. The method of claim 1, wherein said compression device is driven mechanically, thermally, and combinations thereof.

5. The method of claim 1, comprising the step of de-oiling by removing at least a portion of total oil content (TOC) from said source of water prior to entering said heat exchanger.

6. The method of claim 1, comprising the step of pre-treating said source of water prior to entering said heat exchanger.

7. The method of claim 1, comprising the step of de-scaling said source of water by removing at least a portion of scale prone species from said source of water prior to entering said heat exchanger.

8. The method of claim 7, wherein said scale prone species comprise magnesium, calcium, carbonate, bicarbonate, carbonic acid, carbon dioxide, sulfate, strontium, barium, radium, naturally occurring radioactive materials (NORM), silica, transition metals, and combinations thereof.

9. The method of claim 1, comprising the step of recycling a portion of said reject brine stream and mixing said reject brine stream with said source of water prior to entering said heat exchanger.

10. The method of claim 1, comprising the step of linking said desalination train in a brine-forward desalination system; wherein said brine-forward desalination system comprises a plurality of desalination trains arranges in series, in which each of said desalination train comprises at least said heat exchanger, said plurality of flashing stages arranges in series and at least said compression device; wherein each of said desalination train produces said distillate stream and said reject brine stream; wherein said reject brine stream from each of said desalination train with exception of said last desalination train in said brine-forward desalination system passes as a feed to said next succeeding desalination train, whereby each of said desalination train progressively possesses a higher level of total dissolved solids (TDS) than a preceding desalination train, and wherein said reject brine stream from said last desalination train in said brine-forward desalination system is rejected at a level not exceeding 250,000 mg/L of said TDS; thereby said brine forward desalination system is a multi-flashing system without supplying addition heat after said heat exchanger of each said desalination train; and a multi-concentration system without supplying addition sources of water after passing through a first heat exchanger of a first desalination train.

11. A method for desalinating a source of water, said method comprising: feeding said source of water to a desalination train comprising at least one heat exchanger, a plurality of flashing stages arranges in parallel, and at least one compression device; wherein said source of water to be desalinated passes through said heat exchanger and through said plurality of flashing stages arranged in parallel to heat the water to a vaporization temperature by maintaining said flashing stages at a lower pressure; wherein said source of water is at least at a saturation temperature corresponding to the pressure in said flashing stages; wherein at a least a portion of said source of water flashes into vapor in each of said flashing stages; withdrawing said vapor from each of said flashing stages, and compressing at least a portion of said withdrawn vapor by said compression device, and condensing the compressed vapor in said heat exchanger thereby producing a distillate stream; and wherein said source of water is heated before entering said flashing stages of said desalination train; and withdrawing non-flashed water from said flashing stages of said desalination train as a reject brine stream.

12. The method of claim 11, wherein said flashing stages comprise hydrophobic membranes under reduced pressure.

13. The method of claim 11, wherein said flashing stages further comprise vapor-liquid separators under reduced pressure, wherein said vapor-liquid separators comprise hydrophobic demister pads.

14. The method of claim 11, wherein said compression device is driven mechanically, thermally, and combinations thereof.

15. The method of claim 11, comprising the step of de-oiling by removing at least a portion of total oil content (TOC) from said source of water prior to entering said heat exchanger.

16. The method of claim 11, comprising the step of pre-treating said source of water prior to entering said heat exchanger.

17. The method of claim 11, comprising the step of de-scaling said source of water by removing at least a portion of scale prone species from said source of water prior to entering said heat exchanger.

18. The method of claim 17, wherein said scale prone species comprise magnesium, calcium, carbonate, bicarbonate, carbonic acid, carbon dioxide, sulfate, strontium, barium, radium, naturally occurring radioactive materials (NORM), silica, transition metals, and combinations thereof.

19. The method of claim 11, comprising the step of recycling a portion of said reject brine stream and mixing said reject brine stream with said source of water prior to entering said heat exchanger.

20. The method of claim 11, comprising the step of linking each of said desalination train in a brine-forward desalination system; wherein said brine-forward desalination system comprises a plurality of said desalination train arranges in series, in which each of said desalination train comprises at least said heat exchanger, said plurality of flashing stages arranges in parallel, and at least said compression device; wherein each of said desalination train produces said distillate stream and said reject brine stream; wherein said reject brine stream from each of said desalination train with exception of said last desalination train in said brine-forward desalination system passes as a feed to said next succeeding desalination train, whereby each of said desalination train progressively possesses a higher level of total dissolved solids (TDS) than a preceding train, and wherein said reject brine stream from said last desalination train in said brine-forward desalination system is rejected at a level not exceeding 250,000 mg/L of said TDS; thereby said brine forward desalination system is a multi-flashing system without supplying addition heat after said heat exchanger of each of said desalination train; and a multi-concentration system without supplying addition sources of water after passing through a first heat exchanger of a first desalination train.

* * * * *